United States Patent [19]

Hoffer

[11] Patent Number: 4,697,122
[45] Date of Patent: Sep. 29, 1987

[54] SLOW ACTING PHOTO LAMP CONTROL
[75] Inventor: Roy D. Hoffer, Lancaster, Pa.
[73] Assignee: Armstrong World Industries, Inc., Lancaster, Pa.
[21] Appl. No.: 891,610
[22] Filed: Aug. 1, 1986
[51] Int. Cl.[4] ............................................. H05B 37/02
[52] U.S. Cl. ..................... 315/158; 315/151; 315/156; 315/DIG. 4; 315/DIG. 7
[58] Field of Search ......... 315/151, 156, 158, DIG. 4, 315/307, 149

[56] References Cited
U.S. PATENT DOCUMENTS 4,097,782  6/1978  Chambliss .................. 315/DIG. 4
4,135,116  1/1979  Smith ............................... 315/158
4,273,999  6/1981  Pierpoint ........................... 315/158

Primary Examiner—Harold Dixon

[57] ABSTRACT

A room lighting control system which controls the electrical power supplied to the artificial lighting in an area based on the ambient light available. A photocell controlled digital lamp dimming circuit with particularly high stability for time and temperature is combined with a slow response time to avoid short term adjustments. A digital counter is used to determine a large number of steps over the adjustment range and the driving clock operates at a very low frequency, so that changes in light level take a relatively long time, and it takes an exceptionally long time to span the entire adjustment range.

8 Claims, 1 Drawing Figure

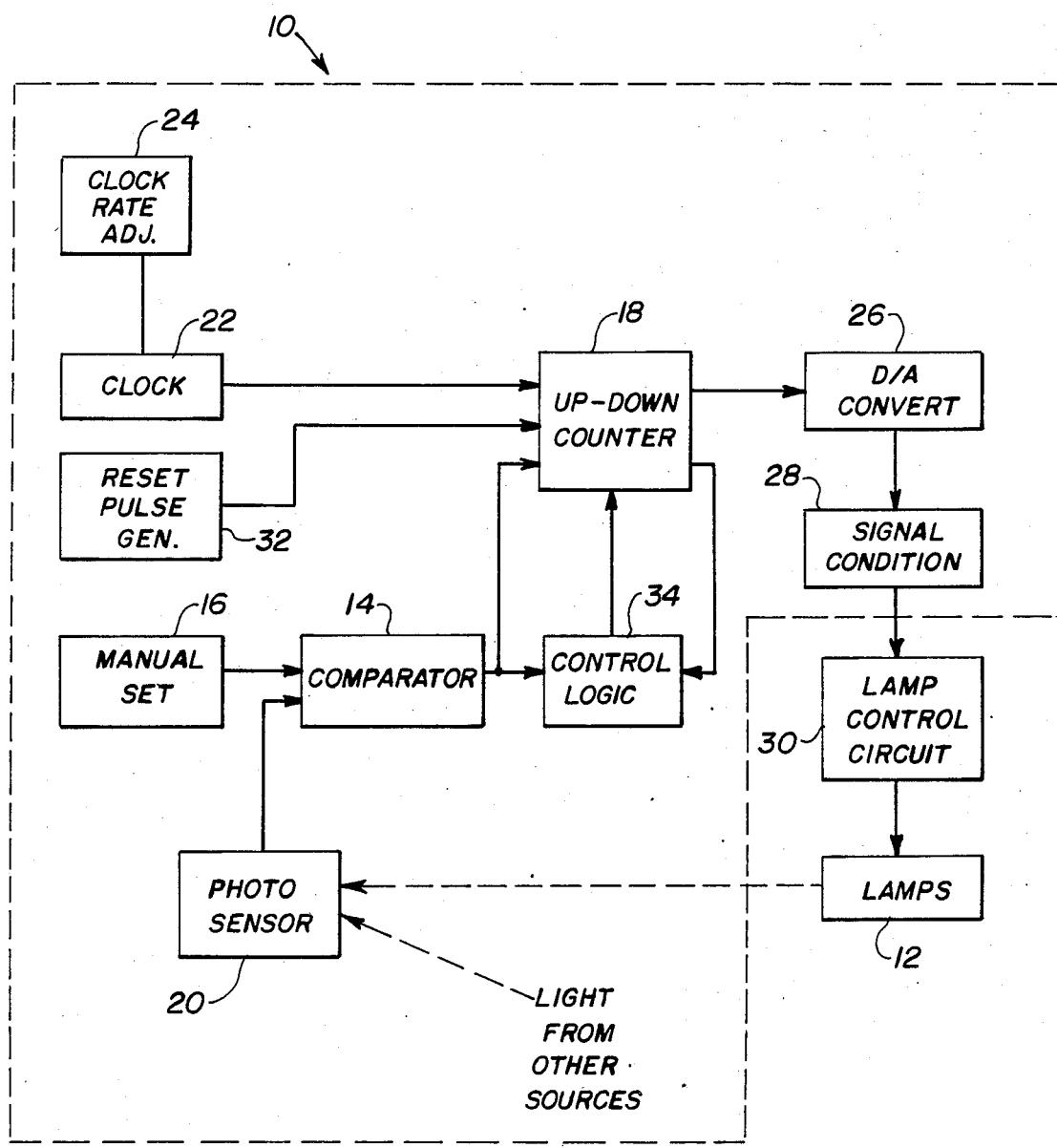

SLOW ACTING PHOTO LAMP CONTROL

BACKGROUND OF THE INVENTION

This invention deals generally with systems for electric lighting and more specifically with a power distribution and dimming system for lamps.

DESCRIPTION OF THE PRIOR ART

In commercial and industrial buildings, lighting costs are of considerable significance. This is so not only because the lighting is usually designed to flood the entire area with high intensity light, but also because the lighting is operated continuously for long periods of time regardless of the availability of alternate sources of light such as natural light. It is a common experience in office buildings to have all the room lights on and consuming full power for large portions of the workday while sunlight is streaming in the windows and furnishing more light than the electrical lights can furnish even at full power. No employee ever seems to think of turning off the lights when the workplace is lit by sunlight, even though such action would save considerable money.

Although light controlled dimming circuits do exist, they have a common fault in that the typical circuit responds too quickly for satisfactory use. A lighting system which turns on and off each time a shadow moves across the sensor is both annoying and economically inefficient.

SUMMARY OF THE INVENTION

The present invention presents a photocell controlled lighting system which is unique and advantageous because it responds very slowly. It therefore virtually ignores the variations of room light which occur on a day when clouds are quickly passing and blocking the sun for short periods. The electronic circuit is also particularly designed for high thermal and long term stability.

These benefits are accomplished by the use of a digital circuit which includes a very slow clock driving a digital counter through a large number of steps. Thus, even a single increment of change in lighting occurs relatively slowly, and changing the lighting level over its entire range, from off to full on, takes much longer than would normally be used.

In the preferred embodiment of the invention the circuit operates at 1 Hz, thereby determining the period for each incremental step of change in light intensity to be one second. The digital counter in the preferred embodiment, the one driven by the clock, is an 8 bit binary counter which includes 256 steps in the range of adjustment. It therefore requires over four minutes to fully sequence the lamp controller through its full range. Such an arrangement assures that no disconcerting instantaneous changes occur in the room light.

The lamp controller of the present invention is also arranged to be self regulating. This is accomplished by simply locating the photosensor so that it monitors not only the ambient light but the total area light, including the lamps controlled by the dimming circuit itself. The photosensor therefore reacts to changes in the lamp output, such as those caused by aging lamps, and automatically adjusts the power input to compensate until the light level actually measured is that prescribed by the manual control setting. The circuit, in fact, does not distinguish between external light sources and the lamp which it is itself controlling. The inherent regulation based on the actual total light monitored produces an extremely stable light level, regardless of lamp temperature, age or other factors.

The present invention therefore furnishes a superior area light intensity control while making full use of ambient light to reduce the cost of lighting.

BRIEF DESCRIPTION OF THE DRAWING

The Figure is a simplified electronic block diagram of the digital circuit of the preferred embodiment.

DEATILED DESCRIPTION OF THE INVENTION

The preferred embodiment of the invention is depicted in simplified block diagram form in the drawing, in which photo dimmer control 10 controls lamps 12.

The control sequence depends upon photosensor 20 which converts the light from both lamps 12 and other sources (not shown) into electrical signals, related to the quantity of light to which photosensor 20 is subjected, which are fed to signal comparator 14. In the preferred embodiment photosensor 20 is a photoresistor which is one leg of a voltage divider.

Comparator 14 also receives an electrical signal from manual setting adjustment 16, which in the preferred embodiment is a simple manually controlled voltage source. Thus, manual setting adjustment 16 feeds a fixed manually controlled voltage to one input of comparator 14 while variations in light intensity falling upon photosensor 20 produce voltage variations on the other input of comparator 14. When the two inputs differ, comparator 14 sends a signal to binary counter 18 to command it to count either up or down depending on whether more or less intensity is required from lamps 12 to meet the standard set by manual setting adjustment 16.

It should be apparent that photosensor 20 disregards the specific source of light, whether it is the lamps being controlled, outside light coming through windows, or another source of artificial light independent of the control circuit. Therefore, any increase in general light level will cause a reduction in the light being produced by lamps 12, and, of course, save electrical power used to produce that light. This is true no matter whether the increase in general light level is due to sunlight or lamps 12 themselves.

The circuit similarly senses and counteracts decreased general light levels. This is particularly beneficial if external factors cause light variations in lamps 12 themselves. If, for instance, the age of lamps 12 or the ambient temperature of the environment causes reduced light output, the circuit compensates by increasing the power to lamps 12.

However, unlike other lamp control circuits, the change is not instantaneous. The present invention specifically uses a slow rate of change of light intensity which prevents momentary changes which must merely be quickly returned to the previous control setting. This action is accomplished by using a very slow clock signal, generated by clock 22. The clock frequency is fed to binary counter 18 and is the signal that determines the rate at which binary counter 18 actually counts when commanded to do so by comparator 14. While typical clock pulses used in most digital circuits operate at thousands or even hundreds of thousands of Hz., the present invention uses a clock rate of 0.2 to 5.0 Hz. In the preferred embodiment the rate used is 1.0 Hz.

This slow rate is adjustable by clock rate adjustment 24 which is manually adjustable in the field so the circuit response can be tailored to the specific conditions of the environment in which it is installed.

The slow clock rate is used in conjunction with the counting register or range of binary counter 18 to determine the full control characteristics of the system. Thus the number of settings available from binary counter 18, that is the number of units it can count, determines the number of increments into which the light intensity range is divided, or the fineness of the control. The preferred counting register for the invention is 100 to 500, and the register selected for the preferred embodiment is 256. The basic goal of the combination of clock rate and counter register is to make the sweep of the entire counter register take more than 20 seconds.

The preferred embodiment uses a counting rate of 1 Hz and a counting register of 256, so that there are 256 steps in the control of lamp 12 and the steps are changed at the rate of one per second. Clearly, that results in the requirements of 256 seconds to sweep the entire range of lamp intensity. This slow change results in the major benefit of the present invention, inherent stability. Unless a significant change in general light intensity occurs for a relatively lengthy period of time, no perceptible change will occur in the intensity of lamps 12. That is not to say that changes will not be occuring. There will be changes as required, but they will be slow and imperceptible to the observer's eye.

The actual change in lamp intensity is accomplishd by the count output from binary counter 18 being converted to an analog signal by digital to analog converter 26. That signal is amplified or otherwise conditioned by signal conditioner 28 and fed to a conventional lamp control circuit 30 which then varies the power supplied to lamps 12.

Reset pulse generator 32 and control logic circuit 34 are auxilliary circuits to control binary counter 18. Reset pulse generator 32 is used to reset the counting register of binary counter 18 to a specific count level when power is first applied to the circuit. This point would normally be full brightness for ease of immediate access to the area being lit, however, if incandescent lamps are being controlled, it may be desirable to select some lower power level to limit the surge currents to which the lamps and power circuit are subjected.

Control logic circuit 34 determines the counting register of binary counter 18. It stops the up count at the number selected, for instance, in the case of the preferred embodiment, 255, and stops the down count at zero. In each case it also determines that the counting process will reverse rather than instantaneously cycle to the other extreme.

The invention as described furnishes a highly stable light intensity control which not only accommodates to external light sources, but also adjusts for any internal factors which affect light output.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, the circuit described could be used with either gas discharge or incandescent lamps, and the response time of the circuit can be varied to meet the needs of specific applications.

What is claimed is:

1. A light sensitive lamp controller comprising:
   (a) a photosensor located to be affected by available light, including light from lamps being controlled by the lamp controller, and generating an electrical signal related to the quantity of light to which it is subjected;
   (b) a manual setting means generating an electrical voltage related to the setting of a manual control;
   (c) a signal comparator electrically connected to the photosensor and to the manual setting means, receiving electrical signals from both, and generating an output of a command signal which varys with the relationship between the signals received from the photosensor and the manual setting means;
   (d) an electronic up-down counter electronically connected to the output of the signal comparator, receiving the command signal from the signal comparator, counting up or down in its register depending upon the command signal received, and generating an output signal varying with the level of the count on its register;
   (e) a clock means electrically connected to the up-down counter and generating and feeding to the up-down counter a signal which repeats at a frequency determined by the clock means, the repeating signal acting upon the up-down counter to determine the rate at which the up-down counter changes the level of its count; and
   (f) lamp control means receiving electrical signals from the up-down counter and varying the electrical power applied to at least one lamp according to the level of the count of the up-down counter.

2. The light sensitive controller of claim 1 wherein the up-down counter generates a digital output signal and further including a digital to analog converter inserted in the signal path between the up-down counter and the lamp control means.

3. The light sensitive controller of claim 1 wherein the frequency generated by the clock is in the range of 0.2 Hz to 5.0 Hz.

4. The light sensitive controller of claim 1 wherein the total count available in the register of the up-down counter is less than 500.

5. The light sensitive controller of claim 1 wherein the time required for the up-down counter to sweep its entire register is at least 20 seconds.

6. The light sensitive controller of claim 1 wherein the frequency of the clock means is adjustable.

7. The light sensitive controller of claim 1 further including a reset pulse generator, electrically connected to the up-down counter, which resets the updown counter to a predetermined count level when electrical power is first applied to the lamp controller.

8. The light sensitive controller of claim 1 further including a control logic circuit electrically connected to the up-down counter and determining the limit of its count.

* * * * *